United States Patent
Goda et al.

(10) Patent No.: US 6,441,106 B1
(45) Date of Patent: Aug. 27, 2002

(54) HARDENER FOR EPOXY RESIN, EPOXY RESIN COMPOSITION, AND PROCESS FOR PRODUCING SILANE-MODIFIED PHENOLIC RESIN

(75) Inventors: Hideki Goda, Kyotanabe; Shoji Takeda, Higashiosaka, both of (JP)

(73) Assignee: Arakawa Chemical Industries, Ltd. (JP)

(*) Notice: Subject to any disclaimer, the term of this patent is extended or adjusted under 35 U.S.C. 154(b) by 0 days.

(21) Appl. No.: 09/623,953

(22) PCT Filed: Jan. 27, 2000

(86) PCT No.: PCT/JP00/00440

§ 371 (c)(1), (2), (4) Date: Sep. 13, 2000

(87) PCT Pub. No.: WO00/44806

PCT Pub. Date: Mar. 8, 2000

(30) Foreign Application Priority Data

| Jan. 29, 1999 | (JP) | 11-020954 |
| Apr. 22, 1999 | (JP) | 11-114635 |
| Dec. 7, 1999 | (JP) | 11-348096 |
| Dec. 9, 1999 | (JP) | 11-349658 |

(51) Int. Cl.$^7$ .................. C08G 59/18; C08G 59/40; C08G 8/28

(52) U.S. Cl. .................. 525/487; 528/25; 528/106; 528/403; 528/408; 528/29; 825/476; 825/523; 825/534

(58) Field of Search ............... 528/25, 29, 106, 528/403, 408; 525/476, 487, 523, 534

(56) References Cited

U.S. PATENT DOCUMENTS

| 4,022,753 A | 5/1977 | Lohse et al. | 260/46.5 R |
| 4,584,340 A | * 4/1986 | Chi | 524/596 |
| 5,177,157 A | * 1/1993 | Akamatsu | 525/398 |
| 5,306,748 A | 4/1994 | Shiobara et al. | 523/443 |
| 5,362,775 A | 11/1994 | Shintai et al. | 523/451 |
| 5,736,619 A | * 4/1998 | Kane et al. | 525/393 |

FOREIGN PATENT DOCUMENTS

| EP | 0013402 | 7/1980 |
| EP | 0423476 | 4/1991 |
| GB | 951065 | 3/1964 |
| JP | 03174744 | 7/1991 |
| JP | 3174745 | 7/1991 |
| JP | 451548 | 2/1992 |
| JP | 09067427 | 3/1997 |
| JP | 09216939 | 8/1997 |

OTHER PUBLICATIONS

English–language Abstract for JP 03 174 744.

English–language Abstract for JP 09 216 939.

* cited by examiner

*Primary Examiner*—Robert Dawson
*Assistant Examiner*—Jeffrey B. Robertson
(74) *Attorney, Agent, or Firm*—Baker Botts LLP

(57) ABSTRACT

The present invention provides a curing agent for epoxy resin containing a siloxane-modified phenol resin (3) obtained by dealcoholization condensation reaction between a phenol resin (1) and a hydrolyzable alkoxysilane (2). The present invention further provides an epoxy resin composition comprising an epoxy resin and the above-mentioned curing agent for epoxy resin. The present invention further provides a method for preparing a siloxane-modified phenol resin (3) characterized by subjecting a phenol resin (1) and a hydrolyzable alkoxysilane (2) to dealcoholization condensation reaction.

13 Claims, 1 Drawing Sheet

HARDENER FOR EPOXY RESIN, EPOXY RESIN COMPOSITION, AND PROCESS FOR PRODUCING SILANE-MODIFIED PHENOLIC RESIN

CROSS REFERENCE TO RELATED APPLICATIONS

This application is a national stage application of PCT/JP00/00440, which was filed on Jan. 27, 2000 and published in Japanese on Aug. 3, 2000, which in turn claims priority from Japanese Application Ser. No. 11/20954 filed Jan. 29, 1999, Japanese Application Ser. No. 11/114635 filed Apr. 22, 1999, Japanese Application Ser. No. 11/348096 filed Dec. 7, 1999, Japanese Application Ser. No. 11/349658, filed Dec. 9, 1999.

TECHNICAL FIELD

The present invention relates to a curing agent for epoxy resin, an epoxy resin composition and a method for preparing a siloxane-modified phenol resin.

BACKGROUND ART

Epoxy resins have been used usually in combination with curing agents. Particularly, phenol novolac resins have been suitably used as curing agents for epoxy resin in the field of electric and electronic materials because of their excellent heat resistance, chemical resistance, electrical characteristic, etc. However, the recent development in the electric and electronic material field has been requiring high-performance epoxy resin compositions. Therefore, the epoxy resin compositions containing the phenol novolac resins as curing agents do not have sufficient heat resistance.

In order to improve the heat resistance of the epoxy resin compositions, glass fibers, glass particles, mica and like fillers are added to epoxy resins in addition to phenol novolac resins used as curing agents. However, these methods using fillers can not impart sufficient heat resistance to the resin compositions. By these methods, the transparency of the cured epoxy resin composition is deteriorated and the interfacial adhesion between the fillers and resins is lowered. Thus, the cured epoxy resin compositions are given insufficient mechanical properties such as elongation rate.

Japanese Unexamined Patent Publication No. 1997-216938 proposes a method for improving the heat resistance of cured epoxy resin composition. In this method, the complex of a phenol novolac resin and silica prepared by hydrolysis and condensation of alkoxysilane in the presence of a phenol novolac resin is used as a curing agent for epoxy resin. The heat resistance of the cured epoxy resin composition comprising such complex as a curing agent is improved to some extent. However, water contained in the curing agent or water and alcohols such as methanol produced during curing cause voids (air bubbles) inside the cured product. Further, increasing the amount of alkoxysilane to further improve the heat resistance of the cured product results in impaired transparency and whitening of the product due to silica aggregation. In addition, solation of a large amount of the alkoxysilane necessitates a large amount of water, which leads to the bends and cracks in the cured product.

DISCLOSURE OF INVENTION

An object of the present invention is to provide a novel phenol resin-based curing agent for epoxy resin which is free from the aforementioned problems of the prior art.

Another object of the present invention is to provide a novel epoxy resin composition which is capable of providing cured products having high heat resistance and no voids (air bubbles) or cracks using a specific phenol resin-based curing agent for epoxy resin.

Another object of the present invention is to provide a novel method for preparing a siloxane-modified phenol resin which is useful as a phenol resin-based curing agent for epoxy resin.

Other objects and features of the present invention will be apparent from the following description.

The present invention provides a curing agent for epoxy resin, the curing agent containing a siloxane-modified phenol resin (3) obtained by dealcoholization condensation reaction between a phenol resin (1) and hydrolyzable alkoxysilane (2).

The present invention also provides an epoxy resin composition comprising an epoxy resin and the above curing agent for epoxy resin.

Further, the present invention provides a method for preparing a siloxane-modified phenol resin (3) characterized by subjecting a phenol resin (1) and hydrolyzable alkoxysilane (2) to dealcoholization condensation reaction.

The inventors of the present invention conducted extensive research to solve the above-mentioned problems of the prior art. Consequently, the inventors found the following: by using the epoxy resin composition comprising a siloxane-modified phenol resin obtained by dealcoholization condensation reaction of a phenol resin and hydrolyzable alkoxysilane as a curing agent for epoxy resin, a cured product having high heat resistance and no voids (air bubbles) and cracks can be obtained. The present invention was accomplished based on this novel finding.

In the present invention, the phenol resins (1) forming the siloxane-modified phenol resin (3) may be any of novolac phenol resins and resol phenol resins. The former can be prepared by reacting a phenol compound and an aldehyde compound in the presence of an acid catalyst, and the latter by reacting a phenol compound and an aldehyde compound in the presence of an alkaline catalyst. The resol phenol resins usually contain condensation water, which may cause hydrolysis of the hydrolyzable alkoxysilane (2). Therefore, the novolac phenol resins are preferably used in the present invention. The phenol resins (1) preferably have an average phenolic unit number of about 3 to about 8.

Examples of useful phenol compounds mentioned in the above include phenol, o-cresol, m-cresol, p-cresol, 2,3-xylenol, 2,4-xylenol, 2,5-xylenol, 2,6-xylenol, 3,4-xylenol, 3,5-xylenol, p-ethylphenol, p-isopropylphenol, p-tertiary butyl phenol, p-chlorophenol and p-bromophenol. Examples of useful formaldehyde compounds include formalin and formaldehyde-generating compounds such as paraformaldehyde, trioxane and tetraoxane. As the acid catalyst or alkaline catalyst, any of those conventionally known is useful.

An example of the hydrolyzable alkoxysilane (2) forming the siloxane-modified phenol resin (3) in the present invention is a compound represented by the following formula or the partial condensate thereof:

(wherein n is an integer of 0 to 2; $R^1$ represents a lower alkyl group which may have a functional group directly bonded to a carbon atom, an aryl group or an unsaturated aliphatic hydrocarbon group; when n is 2, the two $R^1$'s may be the same or different; $R^2$ represents a hydrogen atom or a lower alkyl group and may be the same or different, with the proviso that at least one $R^2$ group is a lower alkyl group.). Examples of the above functional group include a vinyl group, a mercapto group, an epoxy group and a glycidoxy group. The term lower alkyl group indicates a straight-chain or branched-chain alkyl group having 6 carbon atoms or less.

The hydrolyzable alkoxysilane (2) may be suitably selected from the compounds represented by the above formula or their partial condensates, and may be used singly or at least two of them in mixture. However, the hydrolyzable alkoxysilane (2) is preferably a partial condensate whose average number of Si per molecule is about 2 to about 100. The hydrolyzable alkoxysilane whose average number of Si is less than 2 suffers an increase in the amount of unreacted alkoxysilane discharged together with the alcohol from the reaction system during the dealcoholization condensation reaction with the phenol resin (1). When the average number of Si is 100 or greater, the reactivity of the alkoxysilane with the phenol resin (1) is decreased and thus the desired substance is hard to obtain. Because of the availability of commercial products, the average number of Si per molecule may be about 3 to about 20.

Examples of the hydrolyzable alkoxysilane (2) include tetramethoxysilane, tetraethoxysilane, tetrapropoxysilane, tetraisopropoxysilane, tetrabutoxysilane and like tetraalkoxysilanes; methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, 3-glycidoxypropyltrimethoxysilane, 3-glycidoxypropyltriethoxysilane, 3-mercaptopropyltrimethoxysilane, 3-mercaptopropyltriethoxysilane, phenyltrimethoxysilane, phenyltriethoxysilane, 3,4-epoxycyclohexylethyltrimetboxysilane, and like trialkoxysilanes; dimethyldimethoxysilane, dimethyldiethoxysilane, diethyldimethoxysilane, diethyldiethoxysilane and like dialkoxysilanes; and the partial condensates of these compounds.

Among these compounds, preferably used is a partial condensate of at least one member selected from the group consisting of tetraalkoxysilanes and trialkoxysilanes because of their higher rates of the dealcoholization condensation reaction and curing reaction. More preferable is a partial condensate of at least one member selected from the group consisting of tetramethoxysilane and methyltrimethoxysilane.

The siloxane-modified phenol resin (3) in the present invention is prepared by the dealcoholization condensation reaction between the phenol resin (1) and hydrolyzable alkoxysilane (2). This reaction forms the siloxane-modified phenol resin (3) by modifying part of the phenolic hydroxyl group of the phenol resin (1) with the hydrolyzable alkoxysilane (2).

The ratio of the phenol resin (1) to the hydrolyzable alkoxysilane (2) used in this reaction may be such that the resulting siloxane-modified phenol resin (3) contains the phenolic hydroxyl group which acts as a curing agent for epoxy resin. Preferably, the equivalent ratio of phenolic hydroxyl groups of the phenol resin (1) to alkoxy groups of the hydrolyzable alkoxysilane (2) is 0.2 to 10. However, when this equivalent ratio is about 1 (approximately equal in stoichiometry), the dealcoholization reaction is accelerated and therefore thickening and gelation of the solution may occur. Thus, in this case, the progress of the dealcoholization reaction needs to be controlled.

When the above ratio is less than 1, the proportion of the hydrolyzable alkoxysilane (2) in the siloxane-modified phenol resin (3) increases. Since this hydrolyzable alkoxysilane is a curing agent for the epoxy resin, the silica content in the cured epoxy resin composition increases, effectively improving the heat resistance and hardness of the cured product. For example, when using a high molecular epoxy resin having an epoxy equivalent of 400 or greater, the crosslink density of the resulting cured epoxy product is usually lowered. In this case, the suitable ratio is less than 1. However, when the ratio is extremely low, the amount of the phenolic hydroxyl group in the siloxane-modified phenol resin (3) is reduced. This may lead to a decrease in the curing reactivity of the siloxane-modified phenol resin with the epoxy resin, insufficient crosslink density in a cured product and an increase in the proportion of the unreacted hydrolyzable alkoxysilane (2), whereby the whitening of the cured product may be caused. For this reason, the equivalent ratio is preferably 0.2 or higher, more preferably 0.3 or higher.

When the equivalent ratio of phenolic hydroxyl groups to alkoxy groups is greater than 1, the amount of alkoxy groups of the hydrolyzable alkoxysilane (2) remaining in the siloxane-modified phenol resin (3) is lowered. When the epoxy resin is cured with this siloxane-modified phenol resin, alcohols such as methanol and water are hardly produced as a by-product by the condensation reaction of the alkoxysilyl group. Therefore, the formation of bends, voids (air bubbles) and cracks in the cured product can be effectively prevented. Such siloxane-modified phenol resin (3) is useful as a curing agent, for example, for novolac phenol epoxy resin and epoxy resin having an epoxy equivalent less than 400 (particularly an epoxy equivalent of 200 or less) whose cured products are prone to bends, voids (air bubbles) and cracks. When the equivalent ratio is too high, the silica content in the curing agent is decreased and the heat resistance of the cured epoxy resin composition can not be sufficiently improved. Hence, the equivalent ratio is preferably 10 or lower, more preferably 8 or lower.

The siloxane-modified phenol resin (3) is prepared, for example, by mixing the phenol resin (1) and the hydrolyzable alkoxysilane (2), heating the mixture to remove alcohol formed by dealcoholization condensation reaction. The reaction temperature is about 70° C. to about 150° C., preferably about 80° C. to about 110° C. The total reaction time is about 2 hours to about 15 hours. This reaction is preferably performed under substantially anhydrous conditions to prevent the condensation reaction of the hydrolyzable alkoxysilane (2) itself.

In the dealcoholization reaction, conventionally known catalysts may be used to accelerate the reaction. Examples of the catalyst include acetic acid, p-toluenesulfonic acid, benzoic acid, propionic acid and like organic acids; lithium, sodium, potassium, rubidium, cesium, magnesium, calcium, barium, strontium, zinc, aluminum, titanium, cobalt, germanium, tin, lead, antimony, arsenic, cerium, boron, cadmium, manganese and like metals; oxides, organic acid salts, halides, alkoxides and the like of these metals. Among these, organic acids, organotin, tin organoate are particularly preferable. More specifically, acetic acid, dibutyltin dilaurate, tin octoate, etc., are effectively used.

The above reaction can be performed in a solvent or without a solvent. The solvent is not particularly limited insofar as it can dissolve the phenol resin (1) and hydrolyzable alkoxysilane (2). Examples of such solvent include dimethylformamide, dimethylacetamide, methyl ethyl ketone and cyclohexanone. If the rapid progress of dealcoholization reaction is desired, the reaction is preferably performed without the solvent. However, it is favorable to use the solvent when the viscosity of the reaction system is excessively increased for the following reasons: the equivalent ratio of phenolic hydroxyl groups of the phenol resin (1) and alkoxy groups of the hydrolyzable alkoxysilane (2) is about 1; the hydrolyzable alkoxysilane (2) has an average Si number per molecule of 8 or greater.

In the above reaction, in order to obtain the siloxane-modified phenol resin having the desired phenolic hydroxyl equivalent and viscosity, the dealcoholization reaction between the phenol resin (1) and hydrolyzable alkoxysilane (2) may be stopped in the course of the reaction. The method for stopping this reaction is not critical. For example, effective methods are cooling, deactivating the catalyst or adding alcohol to the reaction system upon obtaining the desired amount of alcohol effluent.

The thus-obtained siloxane-modified phenol resin (3) of the present invention contains, as a main component, the phenol resin having at least one of the phenolic hydroxyl groups is modified with silane. The resin (3) may contain unreacted phenol resin (1) and hydrolyzable alkoxysilane (2). Like the normal phenol resin, the unreacted phenol resin (1) acts as a curing agent for epoxy resin. The remaining hydrolyzable alkoxysilane (2) can be converted to silica by hydrolysis and condensation. To promote the hydrolysis and condensation, a catalyst may be added to the siloxane-modified phenol resin (3). The catalyst is selected from a small amount of water; a catalytic amount of formic acid, acetic acid, propionic acid, para-toluenesulfonic acid, methanesulfonic acid and like organic acid catalyst; boric acid, phosphoric acid and like inorganic catalyst; alkaline catalyst; organotin, tin organoate catalyst.

In the present invention, the siloxane-modified phenol resin (3) is used as a curing agent for epoxy resin. The alkoxysilyl group in the siloxane-modified phenol resin (3) of the present invention undergoes hydrolysis and condensation upon contacting water, forming a siloxane bond. Thus, the siloxane-modified phenol resin (3) is subject to changes in molecular weight and viscosity because of external water such as moisture in air. To avoid this effectively, when the siloxane-modified phenol resin (3) is left in an open system for a long time or stored in a humid environment, an alcohol solvent such as methanol may be added to the siloxane-modified phenol resin (3) after the reaction between the phenol resin (1) and the hydrolyzable alkoxysilane (2) is completed.

The epoxy resin composition of the invention is usually prepared by using an epoxy resin and the siloxane-modified phenol resin (3) as a curing agent for epoxy resin. The equivalent ratio of hydroxyl groups of the curing agent to epoxy groups of the epoxy resin may be in the range of about 0.5 to about 1.5.

The epoxy resin may be any of those known conventionally. Examples of the epoxy resin include orthocresol novolac epoxy resin, phenol novolac epoxy resin and like novolac epoxy resin; bisphenol A, bisphenol F and like diglycidyl ethers; glycidyl ester epoxy resin obtainable by reacting phthalic acid, dimer acid and like polybasic acids with epichlorohydrin; glycidyl amine epoxy resin obtainable by reacting diaminodiphenylmethane, isocyanuric acid or like polyamines with epichlorohydrin; and linear aliphatic epoxy resin and alicyclic epoxy resin obtainable by oxidizing olefin bond with peracetic acid and like peracids. These epoxy resins may be used singly or in combinations of two or more types.

The epoxy resin composition may contain an accelerator for curing between epoxy resin and a curing agent. Examples of the accelerator include 1,8-diazabicyclo[5.4.0]undecene-7, triethylenediamine, benzyl-dimethylamine, triethanolamine, dimethylaminoethanol, tris(dimethylaminomethyl)phenol and like tertiary amines; 2-methylimidazole, 2-phenylimidazole, 2-phenyl-4-methylimidazole, 2-heptadecylimidazole and like imidazoles; tributylphosphine, methyl diphenylphosphine, triphenyl phosphine, diphenyl phosphine, phenyl phosphine and like organic phosphines; and tetraphenylphosphonium.tetraphenyl borate, 2-ethyl-4-methylimidazole-tetraphenyl borate, N-methylmorpholine.tetraphenyl borate and like tetraphenyl borates. The accelerator is preferably used in an amount of 0.1 to 5 parts by weight relative to 100 parts by weight of the epoxy resin.

The concentration of the epoxy resin composition can be suitably controlled using a solvent. The solvent may be the same as that used for preparing the siloxane-modified phenol resin. The epoxy resin composition may also contain fillers, mold releasing agents, finishing agents, fire retardants, etc., if necessary.

The curing agent for epoxy resin of the present invention can provide an epoxy resin composition for producing cured products with high heat resistance and without voids (air bubbles).

The epoxy resin composition of the present invention is useful as a IC sealing material, an epoxy resin laminate plates, a coating for electric/electronic materials, a coating composition, inks and the like.

BEST MODE FOR CARRYING OUT THE INVENTION

Figure 1:
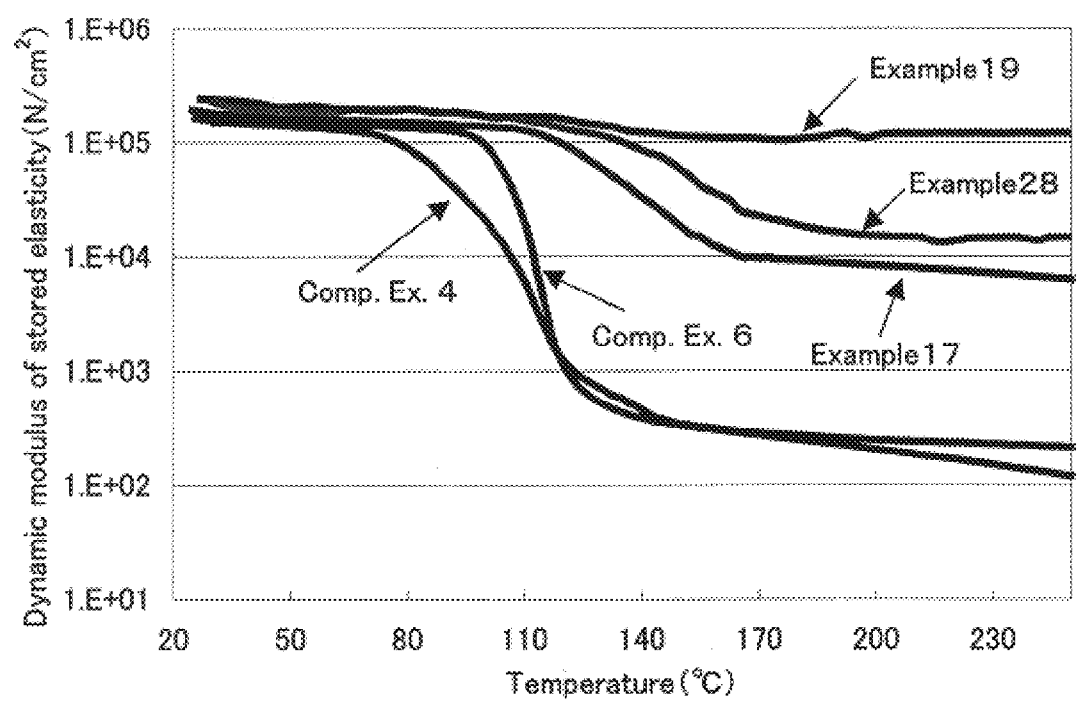
FIG. 1 is a drawing which indicates the evaluation results of the heat resistance of the cured film obtained using the epoxy resin compositions of Examples and Comparative Examples.

The present invention is explained in further details referring to Examples and Comparative Examples below, in which parts and percentages are by weight unless otherwise specified.

In Examples 1–15, the peak area of the phenolic hydroxyl group and methoxy group was determined by $^1$H-NMR of the obtained siloxane-modified phenol resin. Then, the yields of the phenolic OH and methoxy group in the siloxane-modified phenol resin were calculated by the below formula on the basis of the peak area determined in the above.

Phenolic OH yield (%)=(hydroxyl group reacted with alkoxysilane/hydroxyl group of starting phenol resin)×100

Methoxy group yield (%)=(methoxy group reacted with phenolic hydroxyl group/methoxy group of starting hydrolyzable alkoxysilane)×100

Preparation of Curing Agent for Epoxy Resin

EXAMPLE 1

Into a reactor equipped with a stirrer, water distributor, thermometer and nitrogen gas introduction tube were placed 859.5 g of novolac phenol resin ("Tamanol 759" produced by Arakawa Chemical Industries, LTD., trade name) and 400 g of dimethylformamide. The novolac phenol resin and dimethylformamide were dissolved at 100° C. Into the reactor were further placed 190.5 g of the partial condensate of tetramethoxysilane ("Methyl silicate 51" produced by Tama Chemicals Co., Ltd., trade name, average number of Si per molecule: 4) and 2 g of dibutyltin dilaurate as a catalyst. The mixture was heated at 110° C. for 6 hours to subject to dealcoholization reaction, and then cooled to 80° C. The mixture was diluted with dimethylformamide, giving a solution of a siloxane-modified phenol resin (phenolic hydroxyl equivalent of 338, curing agent A) having a nonvolatile content of 50%.

In the starting materials, (phenolic hydroxyl equivalent of phenol resin (1)/alkoxy equivalent of hydrolyzable alkoxysilane (2)) was 2. The amount of removed methanol by the dealcoholization reaction was 43.8 g.

The yield of the phenolic OH in the siloxane-modified phenol resin was 34.8, and the yield of the methoxy group in the same resin was 69.6.

EXAMPLE 2

Into the same reactor as used in Example 1 were placed 662.5 g of a novolac phenol resin ("Tamanol 759" produced by Arakawa Chemical Industries, LTD., trade name) and 400 g of dimethylformamide. The mixture was dissolved at 100° C. To the mixture were further added 587.5 g of a partial condensate of tetramethoxysilane ("Methyl Silicate 51" produced by Tama Chemicals Co., Ltd., trade name) and 2.8 g of acetic acid as a catalyst. The mixture was heated at 110° C. for 6 hours to subject to dealcoholization reaction. The mixture was cooled to 80° C. and diluted with dimethylformamide, giving the solution of a siloxane modified phenol resin (phenolic hydroxyl equivalent of the solution: 614, Curing agent B) having a nonvolatile content of 50%.

In the starting materials, the equivalent ratio of (phenolic hydroxyl groups of the phenol resin (1)/alkoxy groups of the hydrolyzable alkoxysilane (2)) was 0.5. The amount of removed methanol by the dealcoholization reaction was 36.7 g.

The yield of the phenolic OH in the obtained siloxane-modified phenol resin was 50.3% and the yield of methoxy group in the same resin was 25.1%.

EXAMPLES 3–15

The solutions of siloxane-modified phenol resins shown in Table 1 were prepared (Curing agents C–O) following the procedure of Example 1 except that at least one of the conditions under which Example 1 was carried out was changed. The conditions are the types and amount of the novolac phenol resin (1), reaction solvent, hydrolyzable alkoxysilane (2), catalyst and diluting solvent; and dealcoholization reaction time.

In Example 8, however, to the resin solution obtained under the reaction conditions shown in Table 1 was further added 28.9 g of water and 1.0 g of triethylamine. The mixture was subjected to partial condensation reaction at 60° C. for 2 hours, giving the solution of a siloxane-modified phenol resin (Curing agent H).

TABLE 1

| Example | 3 | 4 | 5 | 6 | 7 | 8 | 9 |
|---|---|---|---|---|---|---|---|
| Curing agent | C | D | E | F | G | H | I |
| "Tamanol 759" (g) | 400 | 662.5 | 980 | 980 | 662.5 | 662.5 | |
| Reaction solvent | | | | | | | |
| Name | DMF | CYN | | | | DMF | DMF |
| Amount (g) | 300 | 400 | | | | 400 | 400 |
| "Methyl Silicate-51" (g) | 800 | 587.5 | 1200 | 1200 | 1200 | 587.5 | |
| "Methyl Silicate-56" (g) | | | | | | | 535 |
| Dibutyltin dilaurate (g) | | | 3 | 3 | 3 | 2 | 2 |
| Acetic acid (g) | 2.8 | 2 | | | | | |
| Dealcoholization reaction time (hr) | 4 | 6 | 6 | 6 | 6 | 5 | 10 |
| Diluting Solvent | | | | | | | |
| Name | DMF | CYN | | MEK | MEK/MeOH (3/1) | DMF | DMF |
| Amount ratio | | | | | | | |
| Nonvolatile content of curing agent (%) | 50 | 50 | 70 | 50 | 50 | 50 | 50 |
| Equivalent ratio of starting materials | 0.22 | 0.5 | 0.37 | 0.37 | 0.37 | 0.50 | 0.59 |
| Amount of removed methanol (g) | 48.3 | 34.5 | 59.8 | 59.8 | 44.2 | 36.7 | |
| Yield of phenolic OH (%) | 68 | 45 | 53 | 53 | 53 | 76 | 49 |
| Yield of methoxy group (%) | 15 | 23 | 20 | 20 | 20 | 38 | 30 |
| Equivalent of phenolic hydroxyl group | 980 | 560 | 550 | 770 | 770 | 1370 | 600 |

| Example | 10 | 11 | 12 | 13 | 14 | 15 |
|---|---|---|---|---|---|---|
| Curing agent | J | K | L | M | N | O |
| "Tamanol 759" (g) | 662.5 | 800 | 800 | 800 | 600 | |
| "Tamanol 756D" (g) | | | | | | 662.5 |
| Reaction Solvent | | | | | | |
| Name | DMF | CYN | | CYN | CYN | DMF |
| Amount (g) | 400 | 400 | | 300 | 400 | 400 |
| "Methyl Silicate-51" (g) | 480 | | | 800 | | 587.5 |
| Methyltrimethoxysilane (g) | 100 | | | | | |
| Methyltrimethoxysilane partial condensate A (g) | | 590.3 | 590.3 | | 743.8 | |
| Methyltrimethoxysilane partial condensate B (g) | | | | 580 | | |
| Dibutyltin dilaurate (g) | 2 | 2 | 3 | 3 | | 2 |
| Acetic acid (g) | | | | | 3 | |
| Dealcoholization reaction time (hr) | 6 | 6 | 7 | 9 | 7 | 8 |

TABLE 1-continued

| Diluting Solvent | | | | | | |
|---|---|---|---|---|---|---|
| Name | DMF | CYN | MEK/MeOH | CYN | | DMF |
| (Amount ratio) | | | (3/1) | | | |
| Nonvolatile content of curing agent (%) | 50 | 50 | 66 | 66 | 50 | 50 |
| Equivalent ratio of starting materials | 0.5 | 0.88 | 0.88 | 0.88 | 0.78 | 0.44 |
| Amount of removed methanol (g) | 49.9 | 80 | 80 | 66 | 80 | 32.3 |
| Yield of phenolic OH (%) | 49 | 50 | 50 | 37 | 61 | 40 |
| Yield of methoxy group (%) | 15 | 23 | 20 | 34 | 48 | 18 |
| Equivalent of phenolic hydroxyl group | 600 | 570 | 480 | 350 | 920 | 590 |

In the above Table 1, trade names and abbreviations represent the followings: (1) "Tamanol 759": novolac phenol resin produced by Arakawa Chemical Industries, LTD., trade name (2) "Tamanol 756D": Cresol novolac phenol resin produced by Arakawa Chemical Industries, LTD., trade name (3) Types of reaction solvents and diluting solvents DMF: dimethylformamide, CYN: cyclohexanone, MEK: methyl ethyl ketone, MeOH: methanol (4) "Methyl silicate 51": hydrolyzable alkoxysilane, tetramethoxysilane partial condensate produced by Tama Chemicals Co., Ltd., trade name, average number of Si per molecule: 4 (5) "Methyl silicate 56": hydrolyzable alkoxysilane, tetramethoxysilane partial. condensate produced by Tama Chemicals Co., Ltd., trade name, average number of Si per molecule: 10 (6) Methyltrimethoxysilane: hydrolyzable alkoxysilane (7) Methyltrimethoxysilane partial condensate A: hydrolyzable alkoxysilane produced by Tama Chemicals Co., Ltd., prototype, average number of Si per molecule: 4.5 (8) Methyltrimethoxysilane partial condensate B: hydrolyzable alkoxysilane produced by Tama Chemicals Co., Ltd., prototype, average number of Si per molecule: 5.5 (9) The equivalent ratio of starting materials: phenolic hydroxyl equivalent of phenol resin (1)/alkoxy equivalent of hydrolyzable alkoxysilane (2) (10) Phenolic hydroxyl equivalent: phenolic hydroxyl equivalent of the solution of the siloxane-modified phenol resin which is a curing agent (expressed in grams)

Comparative Example 1

A resin solution (Curing agent P) having a nonvolatile content of 50% was prepared by dissolving a novolac phenol resin ("Tamanol 759" produced by Arakawa Chemical Industries, LTD., trade name) in dimethylformamide.

Comparative Example 2

In 836.1 g of dimethylformamide was dissolved 859.5 g of novolac phenol resin ("Tamanol 759" produced by Arakawa Chemical Industries, LTD., trade name), 190.5 g of tetramethoxysilane partial condensate ("Methyl Silicate 51" produced by Tama Chemicals Co., Ltd., trade name). To the solution was added 27.2 g of water. The solution was stirred, giving a resin solution having a nonvolatile content of 50% (phenolic hydroxyl equivalent of the solution: 223.8, Curing agent Q).

Comparative Example 3

In 590.3 g of dimethylformamide were dissolved 662.5 g of a novolac phenol resin ("Tamanol 759" produced by Arakawa Chemical Industries, LTD., trade name) and 587.5 g of tetramethoxysilane partial condensate ("Methyl Silicate 51" produced by Tama Chemicals Co., Ltd., trade name). To the solution was added 84 g of water. The solution was stirred, giving a resin solution (phenolic hydroxyl equivalent of the solution: 305, Curing Agent R) having a nonvolatile content of 50%.

Viscosity Stability Evaluation 100-g portions of the solutions of the curing agents (Curing agents A–R) obtained in Examples 1–15 and Comparative Examples 1–3 were placed in separate polyethylene containers (capacity: 150 g) immediately after being synthesized. The containers were stored at a temperature of 40° C. and a humidity of 80% for 1 month. The increasing rate (%) of the Brookfield viscosity of the solutions based on the viscosity values determined before and after the storage was calculated by the following formula:

Increasing rate (%)=[(Brookfield viscosity after storage−Brookfield viscosity before storage)/(viscosity before storage)]×100

Based on the above increasing rate, the viscosity stability was rated on the following scales. A: The solution of the curing agent has an increasing rate below 10% and high stability. B: The solution of the curing agent has an increasing rate not lower than 10% but lower than 30% and medium stability. C: The solution of the curing agent has an increasing rate not lower than 30% but lower than 100% and rather low stability. D: The solution of the curing agent has an increasing rate of 100% or higher and low stability.

The results are shown in Table 2 below.

TABLE 2

| Curing Agent | | Viscosity |
|---|---|---|
| Example | Name | stability |
| Ex. 1 | A | A |
| Ex. 2 | B | B |
| Ex. 3 | C | A |
| Ex. 4 | D | C |
| Ex. 5 | E | C |
| Ex. 6 | F | C |
| Ex. 7 | G | A |
| Ex. 8 | H | C |
| Ex. 9 | I | B |
| Ex. 10 | J | C |
| Ex. 11 | K | B |
| Ex. 12 | L | A |
| Ex. 13 | M | B |
| Ex. 14 | N | A |
| Ex. 15 | O | B |
| Comp. Ex. 1 | P | A |
| Comp. Ex. 2 | Q | D |
| Comp. Ex. 3 | R | D |

Preparation of Epoxy Resin Composition

EXAMPLE 16

An epoxy resin ("YD011" produced by TOTO KASEI CO LTD., trade name, epoxy equivalent: 475) was dissolved in dimethylformamide to give a resin solution having a nonvolatile content of 50%. 15.0 g of this resin solution, 5.34 g of the Curing agent A obtained in Example 1 and 0.038 g of 2-ethyl-4-methylimidazole (catalyst) were mixed, giving an epoxy resin composition.

Examples 17–31 and Comparative Examples 4–6

Epoxy resin compositions were prepared in the similar manner as in Example 16 with the exception that the amount (g) of the epoxy resin, types of curing agent and the amount thereof are changed as shown in Table 3.

TABLE 3

| Epoxy resin composition | Mixing ratio (g) | | | |
|---|---|---|---|---|
| | Curing Agent | | Epoxy resin solution | Catalyst |
| | Name | Amount | | |
| Example 16 | A | 5.34 | 15 | 0.038 |
| Example 17 | B | 9.69 | 15 | 0.038 |
| Example 18 | C | 9.69 | 12.5 | 0.038 |
| Example 19 | D | 15.51 | 15 | 0.038 |
| Example 20 | E | 8.86 | 15 | 0.038 |
| Example 21 | F | 8.67 | 15 | 0.038 |
| Example 22 | G | 12.17 | 15 | 0.038 |
| Example 23 | H | 12.17 | 15 | 0.038 |
| Example 24 | I | 21.68 | 15 | 0.038 |
| Example 25 | J | 9.51 | 15 | 0.038 |
| Example 26 | K | 9.47 | 15 | 0.038 |
| Example 27 | L | 8.94 | 15 | 0.038 |
| Example 28 | M | 7.52 | 15 | 0.038 |
| Example 29 | N | 5.54 | 15 | 0.038 |
| Example 30 | O | 14.57 | 15 | 0.038 |
| Example 31 | P | 9.32 | 15 | 0.038 |

Comparative Example 4–8

The epoxy resin compositions of Comparative Examples 4–6 were prepared in the similar manner as in Example 16 with the exception that the types and the amount (g) of curing agents were changed as shown in Table 4. In Comparative Examples 7 and 8, epoxy resin compositions were prepared by further adding thereto the partial condensate of tetramethoxysilane ("Methyl Silicate 51" produced by Tama Chemicals Co., Ltd., trade name) and water at the ratios shown in Table 4.

TABLE 4

| Epoxy resin composition | Mixing ratio (g) | | | | | |
|---|---|---|---|---|---|---|
| | Curing Agent | | Epoxy resin solution | Catalyst | Methyl silicate 51 | Water |
| | Name | Amount | | | | |
| Comparative Example 4 | P | 3.35 | 15 | 0.038 | 0 | 0 |
| Comparative Example 5 | Q | 3.54 | 15 | 0.038 | 0 | 0 |
| Comparative Example 6 | R | 4.82 | 15 | 0.038 | 0 | 0 |
| Comparative Example 7 | S | 4.82 | 15 | 0.038 | 1.03 | 0.15 |
| Comparative Example 8 | T | 4.82 | 15 | 0.038 | 2.35 | 0.38 |

The unit weight ratio of the phenol resin, silica and epoxy resin in the curing agents used in Examples 16–31 and Comparative Examples 4–8 and the cured products produced by using the epoxy resin compositions in the same Examples was calculated from the proportion of the starting materials.

The results are shown in Table 5. In this table, PH represents a phenol resin unit; silica represents a silica unit; and EP represents an epoxy resin unit.

TABLE 5

| | Unit ratio of curing agent | | Unit ratio of cured product | | |
|---|---|---|---|---|---|
| | PH (%) | Silica (%) | EH (%) | PH (%) | Silica (%) |
| Ex. 16 | 89.8 | 10.2 | 73.5 | 23.5 | 2.7 |
| Ex. 17 | 68.9 | 31.1 | 60.6 | 27.0 | 12.2 |
| Ex. 18 | 68.9 | 31.1 | 56.1 | 30.0 | 13.5 |
| Ex. 19 | 47.3 | 52.7 | 49.0 | 24.0 | 26.7 |
| Ex. 20 | 68.9 | 31.1 | 62.7 | 25.5 | 11.5 |
| Ex. 21 | 60.0 | 40.0 | 55.1 | 26.8 | 17.9 |
| Ex. 22 | 60.0 | 40.0 | 55.0 | 26.8 | 17.9 |
| Ex. 23 | 60.0 | 40.0 | 55.0 | 26.8 | 17.9 |
| Ex. 24 | 68.9 | 31.1 | 40.8 | 40.6 | 18.3 |
| Ex. 25 | 68.9 | 31.1 | 61.0 | 26.6 | 12.0 |
| Ex. 26 | 68.9 | 31.1 | 61.1 | 26.6 | 12.0 |
| Ex. 27 | 67.6 | 32.4 | 62.5 | 25.2 | 12.1 |
| Ex. 28 | 67.6 | 32.4 | 60.1 | 26.8 | 12.8 |
| Ex. 29 | 67.6 | 32.4 | 67.1 | 22.0 | 10.6 |
| Ex. 30 | 52.0 | 48.0 | 50.6 | 25.6 | 23.6 |
| Ex. 31 | 68.9 | 31.1 | 61.5 | 26.3 | 11.9 |
| Comp. Ex. 4 | 100 | 0.0 | 81.4 | 18.2 | 0 |
| Comp. Ex. 5 | 89.8 | 10.2 | 80.6 | 17.1 | 1.9 |
| Comp. Ex. 6 | 68.9 | 31.1 | 75.4 | 16.7 | 7.5 |
| Comp. Ex. 7 | 68.9 | 31.1 | 71.6 | 15.8 | 12.2 |
| Comp. Ex. 8 | 68.9 | 31.1 | 67.3 | 14.9 | 17.5 |

As seen from the Table 5, Example 16 and Comparative Example 5 have approximately the same ratio of phenol resin unit/silica unit in the curing agent. The same applies to Example 17 and Comparative Example 6. Example 17 and Comparative Example 7 have the similar amount of silica unit in the cured product. The same applies to Examples 21 to 23 and Comparative Example 8.

Preparation of Cured Film

The epoxy resin compositions obtained in Examples 16–31 and Comparative Examples 4–8 were charged into separate containers (length×width×height=10 cm×10 cm×1.5 cm) with fluororesin coatings. The removal of solvents from the compositions and curing of the compositions were carried out at 135° C. for 1 hour and then at 160° C. for 2 hours. Transparent cured films (thickness: about 0.4 mm) could be produced by using the compositions of Examples 16–31 and Comparative Examples 4–7. On the other hand, Comparative Example 8 underwent considerable foaming and shrinkage during curing and was unable to form a practical cured film.

Evaluation of Heat Resistance

The above cured films produced by using the compositions of Examples 17, 19, 28, Comparative Examples 4 and 6 were tested for their dynamic modulus of stored elasticity by viscoelasticity meter ("DVE-V4" produced by Rheology Corporation, trade name, measurement conditions: amplitude: 1 mm, frequency: 10 Hz, slope: 3° C./minute). The heat resistance of the films was evaluated based on the measurement of the dynamic modulus of stored elasticity. The results of measurement are shown in FIG. 1, which reveals the excellent heat resistances of the cured films of Examples.

Evaluation of Bubble and Shrinkage

The cured products (10 cm×10 cm×0.4 mm), i.e. the cured films prepared in the above Preparation of cured film, were used for evaluation. The degrees of bubble and shrinkage of the cured products were rated on the following scales.

The scales for evaluating the degree of bubble are as follows. A: The cured product has no bubbles, B: The cured product has 5 bubbles or less, C: the cured product has 6 to 20 bubbles, D: The cured product has 21 bubbles or more.

The scales for evaluating the degree of shrinkage are as follows. A: The cured product has no cracks or bends, B: The cured product has no cracks but some bends, C: the cured product has cracks and bends, D: The cured product is broken.

The results are shown in Table 6.

|  | Bubble | Shrinkage |
|---|---|---|
| Example 16 | A | A |
| Example 17 | B | B |
| Example 18 | B | B |
| Example 19 | C | C |
| Example 20 | B | B |
| Example 21 | B | B |
| Example 22 | B | C |
| Example 23 | B | C |
| Example 24 | A | C |
| Example 25 | B | A |
| Example 26 | B | A |
| Example 27 | A | A |
| Example 28 | A | A |
| Example 29 | A | A |
| Example 30 | B | A |
| Example 31 | B | B |
| Comp. Ex. 4 | A | A |
| Comp. Ex. 5 | B | C |
| Comp. Ex. 6 | C | C |
| Comp. Ex. 7 | D | D |
| Comp. Ex. 8 | D | D |

What is claimed is:

1. A curing agent for epoxy resin, the curing agent containing a siloxane-modified phenol resin (3) which is obtained by dealcoholization condensation reaction between a phenol resin (1) and hydrolyzable alkoxysilane (2), wherein the hydrolyzable alkoxysilane (2) is a partial condensate of a compound represented by the formula $R^1_n Si(OR^2)_{4-n}$, wherein n is 0 or 1, $R^1$ is a lower alkyl group, and $R^2$ is a lower alkyl group which may be the same or different.

2. The curing agent according to claim 1, wherein the equivalent ratio of phenolic hydroxyl groups of the phenol resin (1) to alkoxy groups of the hydrolyzable alkoxysilane (2) is in the range of 0.2 to 10.

3. The curing agent according to claim 1, wherein the phenol resin (1) is a novolac phenol resin.

4. The curing agent according to claim 1, wherein the hydrolyzable by alkoxysilane (2) is a partial condensate having an average number of Si per molecule of about 2 to about 100.

5. The curing agent according to claim 1, wherein the hydrolyzable alkoxysilane (2) is a partial condensate of at least one of tetramethoxysilane and methyltrimethoxysilane.

6. The curing agent according to claim 1, the curing agent further containing alcohol.

7. An epoxy resin composition comprising an epoxy resin and the curing agent of claim 1.

8. The epoxy resin composition according to claim 7, wherein the epoxy resin and the curing agent are contained at the equivalent ratio of hydroxyl groups of the curing agent to epoxy groups of the epoxy resin ranging from about 0.5 to about 1.5.

9. A method for preparing a siloxane-modified phenol resin (3) comprising subjecting a phenol resin (1) and hydrolyzable alkoxysilane (2) to dealcoholization reaction, wherein the hydrolyzable alkoxysilane (2) is a partial condensate of a compound represented by the formula $R^1_n Si(OR^2)_{4-n}$, wherein n is 0 or 1, $R^1$ is a lower alkyl group, and $R^2$ is a lower alkyl group which may be the same or different.

10. The method according to claim 9, wherein the equivalent ratio of phenolic hydroxyl groups of the phenol resin (1) to alkoxy groups of the hydrolyzable alkoxysilane (2) is in the range of 0.2 to 10.

11. The method according to claim 9, wherein the phenol resin (1) is a novolac phenol resin.

12. The method according to claim 9, wherein the hydrolyzable alkoxysilane (2) is a partial condensate having an average number of Si per molecule of about 2 to about 100.

13. The curing agent according to claim 9, wherein the hydrolyzable alkoxysilane (2) is a partial condensate of at least one of tetramethoxysilane and methyltrimethoxysilane.

* * * * *

UNITED STATES PATENT AND TRADEMARK OFFICE
CERTIFICATE OF CORRECTION

PATENT NO. : 6,441,106 B1
DATED : August 27, 2002
INVENTOR(S) : Goda et al.

It is certified that error appears in the above-identified patent and that said Letters Patent is hereby corrected as shown below:

Title page, Item [54] and Column 1, line 1,
"HARDENER FOR EPOXY RESIN, EPOXY RESIN COMPOSITION, AND PROCESS FOR PRODUCING SILANE-MODIFIED PHENOLIC RESIN" should read -- CURING AGENT FOR EPOXY RESIN, EPOXY RESIN COMPOSITION AND METHOD FOR PREPARING SILOXANE-MODIFIED PHENOL RESIN --

Column 2,
Line 62, "$Si(OR^{2)}{}_{4-n}$," should read -- $Si(OR^2)_{4-n}$, --
Line 67, "$R^1$'s" should read -- $R^1$s --

Column 3,
Line 3, "group.)." should read -- group). --
Line 39, "epoxycyclohexylethyltrimetboxysilane" should read
-- epoxycyclohexylethyltrimethoxysilane --

Column 6,
Line 11, "tetraphenylphosphonium.tet-" should read
-- tetraphenylphosphonium•tet --
Line 13, "N-methylmorpholine.tetraphenyl" should read
-- N-methylmorpholine•tetraphenyl --

Column 9,
Line 15, "followings:" should read -- following: --
Line 26, "partial." should read -- partial --
Line 61, "25" should be deleted Column 11,
Line 33, "Example" should read -- Examples --

Column 13,
Line 35, "$Si(OR^{2)}{}_{4-n}$," should read -- $Si(OR^2)_{4-n}$, --

UNITED STATES PATENT AND TRADEMARK OFFICE
CERTIFICATE OF CORRECTION

PATENT NO. : 6,441,106 B1
DATED : August 27, 2002
INVENTOR(S) : Goda et al.

It is certified that error appears in the above-identified patent and that said Letters Patent is hereby corrected as shown below:

Column 14,
Line 4, "by" should be deleted
Line 24, "$(OR^{2)})_{4-n}$" should read -- $(OR^2)_{4-n}$, --

Signed and Sealed this

Seventeenth Day of June, 2003

JAMES E. ROGAN
*Director of the United States Patent and Trademark Office*